July 3, 1934.  W. G. WILSON  1,965,518
TORQUE TRANSMITTING APPARATUS
Filed July 22, 1932  2 Sheets-Sheet 2

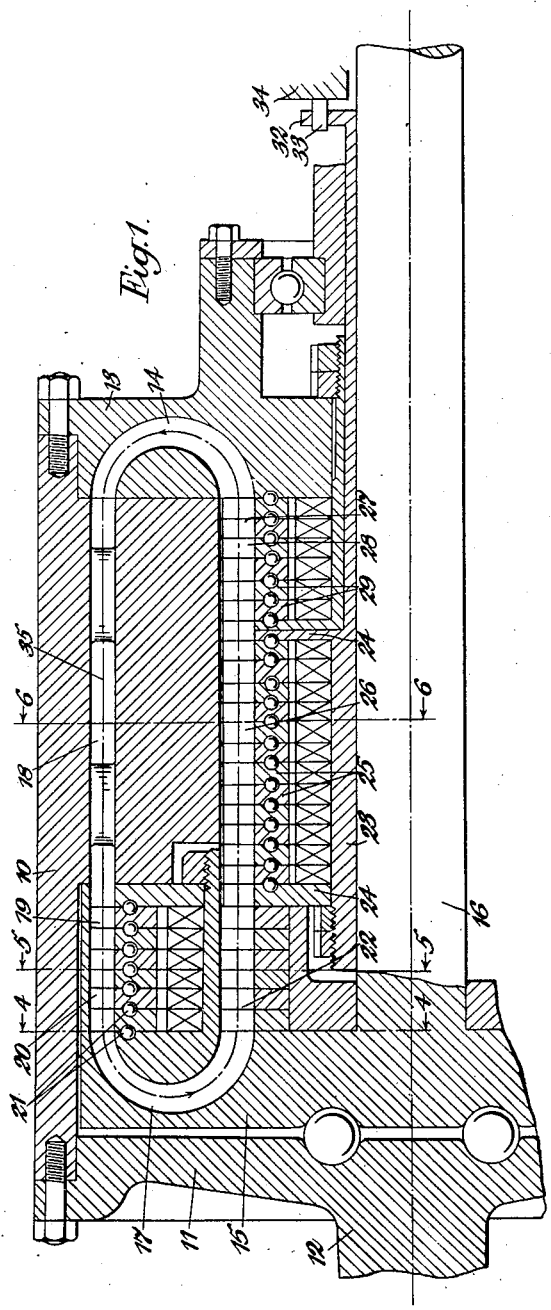
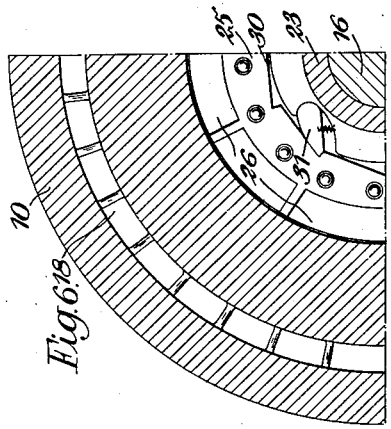
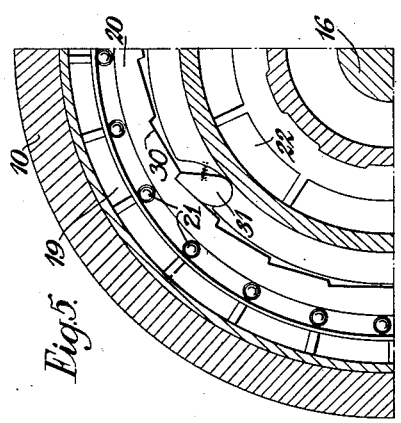
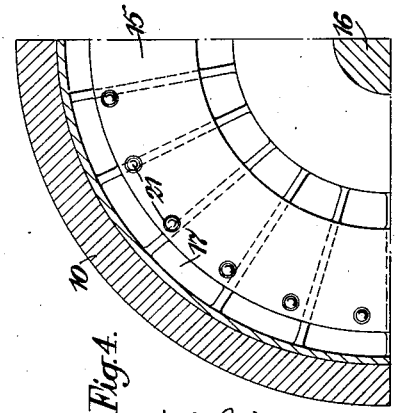

Patented July 3, 1934

1,965,518

UNITED STATES PATENT OFFICE 1,965,518

TORQUE TRANSMITTING APPARATUS

Walter Gordon Wilson, Westminster, London, England

Application July 22, 1932, Serial No. 624,136
In Great Britain July 28, 1931

4 Claims. (Cl. 60—54)

This invention relates to the transmission of power and particularly torque transmitting apparatus in which a suitable fluid forms the transmission element.

More particularly the invention is concerned with rotary mechanism for the transmission of power at varying speeds of the kind in which from an applied primary speed and torque there may be obtained a secondary speed and torque, the torque varying in accordance with the load carried by the secondary, whilst the speed varies inversely as the torque. Such mechanism is sometimes known as a fluid flywheel.

Mechanism of this character has consisted in mounting on the driving and driven shafts respectively, one half of a hollow casing, the two halves facing one another, and a suitable fluid such as oil being adapted to circulate between the two half casings. The two casings are so fitted with radial passages and vanes that the fluid is not only subjected to centrifugal action, but also to a radial circulation, that is to say, the fluid in one radial passage of the driving part of the casing first moves outward from the centre and then passes into the opposite radial passage of the driven part of the casing, inwards towards the centre, and from thence back into the same or another passage of the driving part and so on.

In this way the driving half of the transmission imparts its primary speed and torque to the driven half of the device, inducing in such driven part a secondary speed and torque depending upon the rotational speed, the particular fluid used and the load on the driven part. In order to supplement such an induced speed and torque, a series of reaction vaned wheels have been arranged in the path of the fluid as it leaves the driven element to pass back again to the driving element each of such wheels being arranged in a manner similar to that of a freewheel, and thus being able to rotate in one direction of rotation but being locked in the other direction. In this way the fluid is adapted by impingement upon the reaction vanes, in the direction in which they are fixed, to receive a positive reaction which results in an increased secondary torque.

The object of the present invention is to more effectively co-ordinate the flow of the circulating fluid between the rotary members and/or the vanes in order to prevent any eddying movement in the liquid or eddy currents being formed therein by which power might be wasted.

Figure 2:
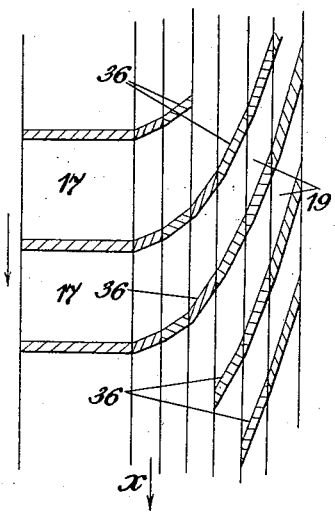
Figure 3:
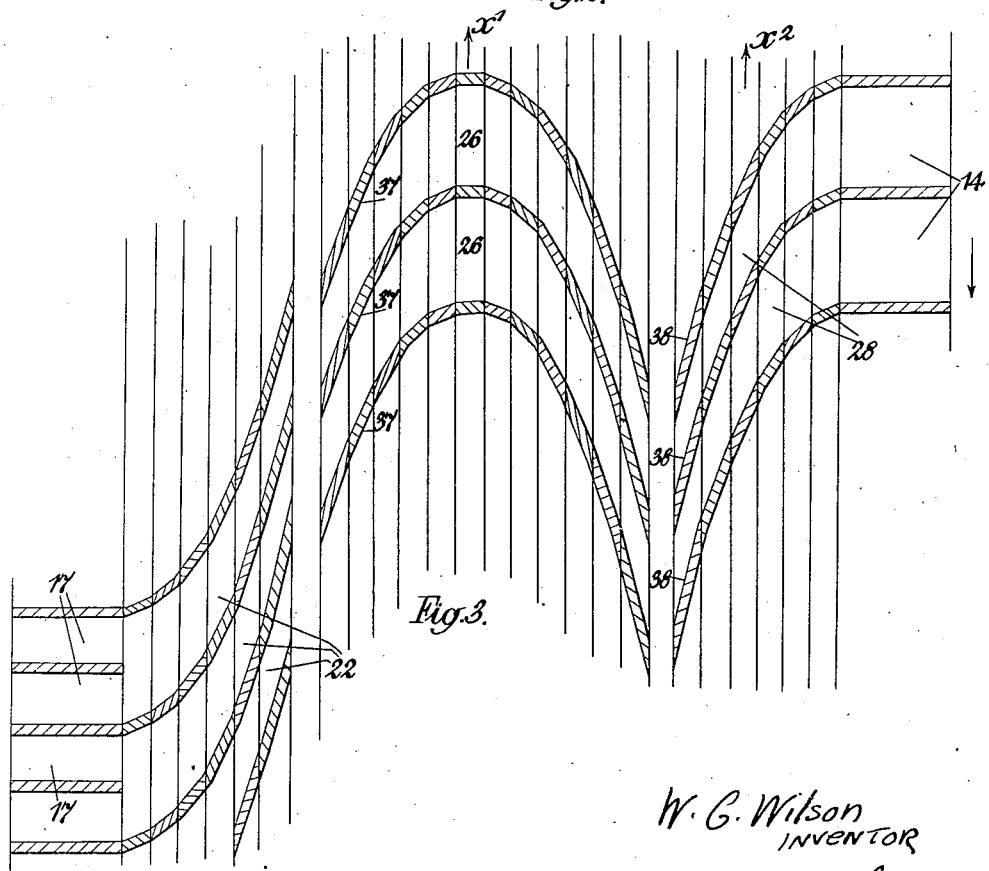

The invention will now be described with reference to the accompanying drawings, in which:

Figure 1 is an axial longitudinal section of one half of a rotary transmission according to the invention, Figure 2 is a developed view of some of the vane passages for directing the flow as it passes from the driver element into the driven element, Figure 3 is a similarly developed view of the vane passages for the fluid as it leaves the driven element, some of the fluid passages in the associated reaction member, and some of the passages which direct the fluid back to the driver element.

Figures 4, 5 and 6 are cross sectional views of Figure 1, taken on the lines 4—4, 5—5 and 6—6 respectively.

In carrying the invention into effect, the power input or driving member constitutes a hollow cylindrical casing 10, with one closing end 11 integral with the driving shaft 12, and being formed at its other closing end 13, with a series of radial passages 14. Nested within the casing 10 and adjacent to the closing end 11 is a circular disc 15 integral with the driven shaft 16. Such disc 15 is also provided with a series of radial passages 17 similar to those in the closing member 13. As is well known in these fluid flywheel devices such passages 14 and 17 form circulating passages for a fluid in the casing.

Assuming that the fluid in the passages 14 is travelling in the direction of the arrow shown in Figure 1, the fluid after leaving member 13 is conveyed through an annular duct or a series of ducts 18 towards the circulating passages 17 but before the fluid reaches them, it is caused to pass through a series of vane passages 19 of helical form and some of which are shown developed in Figure 2. Each vane passage is a composite element formed by a number of apertures in a corresponding number of disc-rings 20 arranged side by side and supported in any suitable way. Balls 21 may be arranged between the several discs, each disc having on one side sockets for the balls (Figures 4 and 6) and on the other side a race-way to accommodate the balls of the adjacent disc (Figure 5), the arrangement serving to position the discs and to permit them to turn, as hereinafter explained, relatively to one another. Each disc has a number of openings or apertures therein, the wall of each of which is not normal to the plane of the ring or disc but is oblique thereto, the degree of obliquity varying from disc to disc so that when all of the openings are in register, a complete curved or helical vane passage is obtained of the form shown in Figure 2. The number of such passages thus formed will be equal to, or more or less than, the number of circulating passages 17, and one end of any one composite vane passage will lie against the inner face of the driven member 15, whilst the other end of such passage will be in communication with the duct or ducts 18, and the number of such ducts will be equal or approximately equal to the number of vane passages.

Assuming that the driving member 13 is rotating in an anti-clockwise direction, as seen from the right in Figure 1, as the fluid passing along the ducts 18 reaches the entrances to the various vane passages 19, it will receive an initial directional movement to pass without disturbance into and along the passages 19 which by their helical form lead the fluid into the mouths of the various circulating passages 17 of the driven member. These passages are radial and after leading the fluid inward towards the centre shaft, discharge again into a second series of nozzles 22 as shown in Figure 3 all fixed upon the driven shaft 16. Such nozzles are of tapering form to impart velocity to the fluid.

Following upon the nozzles 22 there is arranged upon the driven shaft a sleeve 23 which in turn is adapted to carry between end plates 24, a number of ported discs 25 similar to those at 20 and which serve between them to form a series of composite curved or helical fluid reaction vane passages 26 shown more clearly in Figure 3. The discs 25 are also free to rotate in one direction but are fixed in the other direction after the manner of a freewheel, the sleeve 23 being extended outward and fitted with a suitable locking mechanism, which may comprise for example a flange ring 32 Figure 1, on the outer end of sleeve 23, which ring is held by a locking pin 33 fixed rigidly to and projecting from a fixed member 34 which may be a part of the machine frame. The vane passages 26 which collectively form a reaction element are similar in shape to a hair-pin bend and present on one side a series of passages which have a direction corresponding with, or which is in continuation of, that of the nozzles 22 that carry the fluid away from the driven member. After passing into the vane passages 26, the direction of the fluid is reversed and finally issues from the ends of the passages at the other side where the fluid meets with another series 27 of composite vane passages 28 formed by another group of discs 29 adapted to rotate with the driving member 13, but are adapted to rotate freely in the same direction as, and relatively to the driving shaft but are fixed in the opposite direction in relation thereto.

The various groups of discs above referred to constitute in effect a number of freewheels each having independent movement in one direction of rotation but none in the other. To obtain such a freewheel effect, any suitable construction may be adopted, and in Figures 4 and 5 by way of example they are each shown as being fitted with a ring of ratchet teeth 30 and a detent 31 to lock movement as desired.

From the foregoing it will be understood that the fluid circulates continuously in the closed path indicated by the chain dotted line at 35 Figure 1, and assuming the circumferential rotation of the device to be anti-clockwise as seen from the right-hand end of Figure 1, then the fluid will circulate in the direction of the arrows in this figure.

It should be explained that the vane passages 19 are fixed against movement in the direction of the arrow $x$ (Figure 2) in relation to the driven shaft, the reaction vane passages are fixed against movement in the direction of arrow $x'$ (Figure 3), and the vane passages 28 cannot move in the direction of the arrow $x^2$ in relation to the driving shaft.

The operation of the device is as follows:

The whole casing contains a suitable quantity of fluid, and at starting up the driving shaft the output will be nil. As the fluid begins to circulate, the vane passages 19 will all be in action i. e. the various openings in the discs will all be in register and will form the defined nozzles shown in Figure 2, it being understood that the force of the fluid will be such that it will press upon the surfaces 36 that is to say, in the direction in which the vane wheels are fixed. The nozzles 22 are always in action leading the fluid away from the driven member 15. The reaction vane passages 26 will all be in action the fluid pressing upon the sides 37 facing the fixed side but the associated passages 28 will at first be in action as the circumferential speed of the vanes 28 exceeds the circumferential speed of the fluid due to the angularity of the passages 26.

As the speed of the driven shaft however increases the flow of liquid will increase. Nozzles 22 still remain in action, and the reaction vane passages 26 will all be in action. As the velocity of the fluid further increases, the circular velocity of the fluid is also increased on leaving the reaction vanes 26, therefore the vanes 28 start to come out of action from the finest helix, that is from left to right, it being understood that the fluid will then tend to press more and more upon the sides 38, the discs freewheeling.

When now the driven shaft starts to rotate the vane passages 19 gradually go out of action, nozzles 22 remain in action, vanes 26 go out of action starting from the left and vanes 28 come into action starting from the right.

It should be understood that, as the fluid leaves the nozzles 22, it is altered in direction by the passages 26 increasing its circular velocity in the direction of rotation of the driving member and thereby giving a reaction torque to the vanes 26 which torque increases the output torque of the driven members.

When the speed of the driven shaft equals, or approximates to, that of the driving shaft, all of the vane passages 19 are out of action, nozzles 22 remain in action, reaction vane passages 26 are all out of action, but the vane passages 28 all come into action giving a proper pick-up of the fluid which issues from the nozzles 22, since the vane passages 28 which move with the driving element 14 are moving faster than the passages 26 and therefore tend to scoop up the water as it leaves the latter passages.

Any suitable fluid may be used in the device such as water or oil of suitable viscosity, or in special cases it is preferred to use mercury.

Having now described my invention, what I claim as new and desire to secure by Letters Patent is:—

1. Hydraulic apparatus for transmitting power, comprising a driving member and a driven member, fluid circuits formed by a plurality of U-shaped passages in the driving member and a plurality of similar passages in the driven member, the openings of the passages facing one another, guide vanes, rotatable in one direction only relative to said driven member positioned between the outlets of the passages in the driving member and the inlets of the passages in the driven member, and reaction guide vanes rotatable in one direction only positioned between the outlets of the passages in the driven member and the inlets of the passages in the driving member.

2. Hydraulic apparatus for transmitting power, comprising a driving member and a driven member, fluid circuits formed by a plurality of U-shaped passages in the driving member and a plurality of similar passages in the driven member, the openings of the passages facing one another, guide vanes rotatable in one direction only relative to said driven member positioned between the outlets of the passages in the driving member and the inlets of the passages in the driven member, reaction guide vanes rotatable in one direction only positioned adjacent the outlets of passages in the driven member and guide vanes rotatable in one direction only relative to said driving member positioned between the outlets of said reaction guide vanes and the inlets of the passages in the driving member.

3. Hydraulic apparatus as claimed in claim 1, in which the guide vanes are constituted by a plurality of elements each adapted to rotate in one direction only, the relative positions of the elements being determined by the action of the fluid.

4. Hydraulic apparatus as claimed in claim 1 in which the first mentioned guide vanes are carried by the driven member and are arranged so as to be capable of rotation in the opposite direction to the direction of rotation of such driven member but not in advance thereof.

WALTER GORDON WILSON.